United States Patent
Medley

(10) Patent No.: US 8,477,419 B1
(45) Date of Patent: Jul. 2, 2013

(54) SYSTEM AND METHOD FOR AUTOMATICALLY ALIGNING A TELESCOPE WITHOUT REQUIRING USER INTERVENTION

(75) Inventor: Danyal Medley, Lakewood, CA (US)

(73) Assignee: Celestron, LLC, Torrance, CA (US)

( * ) Notice: Subject to any disclaimer, the term of this patent is extended or adjusted under 35 U.S.C. 154(b) by 404 days.

(21) Appl. No.: 12/983,085

(22) Filed: Dec. 31, 2010

(51) Int. Cl.
*G02B 23/00* (2006.01)

(52) U.S. Cl.
USPC ...... 359/429; 359/399; 359/430; 356/139.01; 356/139.04

(58) Field of Classification Search
USPC .................. 359/399, 429–430; 382/103, 201, 382/284; 700/56–57, 65; 356/139.01, 139.04
See application file for complete search history.

(56) References Cited

U.S. PATENT DOCUMENTS

| | | | |
|---|---|---|---|
| D268,786 S | | 4/1983 | Galindo |
| 5,133,050 A | * | 7/1992 | George et al. ................ 345/632 |
| 5,223,702 A | | 6/1993 | Conley |
| 5,243,351 A | | 9/1993 | Rafanelli et al. |
| 5,335,190 A | | 8/1994 | Nagle et al. |
| 5,525,793 A | | 6/1996 | Holmes et al. |
| D390,583 S | | 2/1998 | Diebel et al. |
| D392,657 S | | 3/1998 | Diebel et al. |
| 5,745,869 A | | 4/1998 | van Bezooijen |
| D412,920 S | | 8/1999 | Diebel et al. |
| 5,935,195 A | | 8/1999 | Quine |
| D417,680 S | | 12/1999 | Diebel et al. |
| D417,881 S | | 12/1999 | Diebel et al. |
| D422,610 S | | 4/2000 | Diebel et al. |
| 6,266,616 B1 | | 7/2001 | Needelman |
| 6,304,376 B1 | * | 10/2001 | Baun et al. .................... 359/429 |
| 6,369,942 B1 | | 4/2002 | Hedrick et al. |
| 6,392,799 B1 | | 5/2002 | Baun et al. |
| 6,445,498 B1 | | 9/2002 | Baun et al. |
| 6,563,636 B1 | | 5/2003 | Baun et al. |
| 6,603,602 B1 | * | 8/2003 | McWilliams ................. 359/430 |

(Continued)

FOREIGN PATENT DOCUMENTS

| | | |
|---|---|---|
| EP | 0785453 | 10/2001 |
| WO | 2004049033 | 6/2004 |
| WO | 2009057163 | 5/2009 |

OTHER PUBLICATIONS

Carpenter, Gail, et al., "Searching the sky with CONFIGR-STARS", Neural Networks, Elsevier Science Publishers, vol. 24, No. 2, Oct. 26, 2010, pp. 208-216.

"Plate Solving, Pointing Correction & Auto Mapping (A laymen's explanation)", Apr. 7, 2009. Retrieved from the Internet: URL:http://www.jatobservatory.org/remote_control/platesolve.html.

(Continued)

*Primary Examiner* — Ramesh Patel
(74) *Attorney, Agent, or Firm* — Raubvogel Law Office

(57) ABSTRACT

According to various embodiments, a telescope is automatically aligned without requiring user intervention and without requiring knowledge of actual local time or location. A mount model specifying a relationship between a telescope's internal coordinate system and a celestial coordinate system is generated using an arbitrary time, arbitrary telescope location, and a number of alignment reference points. A pointing error for the initial mount model is determined, for example using a plate solving technique to translate between plate coordinates and celestial coordinates for the alignment reference points. Time and location values are iteratively adjusted to reduce the pointing error until it is acceptably low. In one embodiment, adjustments are made by reference to a local sidereal time (LST) offset and/or a latitude value. In one embodiment, the iterative adjustment is performed using a two-phase methodology, including a coarse adjustment followed by a fine adjustment.

31 Claims, 10 Drawing Sheets

U.S. PATENT DOCUMENTS

| | | | |
|---|---|---|---|
| D492,334 S | 6/2004 | Hines et al. | |
| D496,672 S | 9/2004 | Hines et al. | |
| D496,673 S | 9/2004 | Hines et al. | |
| D502,201 S | 2/2005 | Hines et al. | |
| D502,481 S | 3/2005 | Hines et al. | |
| 6,972,902 B1* | 12/2005 | Chen et al. | 359/429 |
| 7,046,438 B2 | 5/2006 | McWilliams | |
| 7,194,146 B2 | 3/2007 | BenDaniel et al. | |
| 7,313,763 B1 | 12/2007 | Bisque et al. | |
| 7,339,731 B2 | 3/2008 | Baun et al. | |
| 7,349,804 B2 | 3/2008 | Belenkii et al. | |
| 7,382,448 B1 | 6/2008 | Hedrick et al. | |
| 7,526,100 B1 | 4/2009 | Hartman et al. | |
| 8,279,522 B2* | 10/2012 | Fujimoto et al. | 359/430 |
| 8,401,307 B1* | 3/2013 | Rowe et al. | 382/201 |
| 2003/0086150 A1 | 5/2003 | Moon et al. | |
| 2003/0156324 A1 | 8/2003 | Baun et al. | |
| 2003/0197930 A1 | 10/2003 | Baun et al. | |
| 2003/0202682 A1* | 10/2003 | Yanagisawa et al. | 382/103 |
| 2004/0047036 A1 | 3/2004 | Baun et al. | |
| 2004/0233521 A1 | 11/2004 | McWilliams | |
| 2005/0168811 A1 | 8/2005 | Mattei | |
| 2005/0225854 A1 | 10/2005 | McWilliams | |
| 2006/0001956 A1 | 1/2006 | Baun et al. | |
| 2006/0018012 A1 | 1/2006 | Smith et al. | |
| 2006/0028720 A1 | 2/2006 | Harrelson | |
| 2006/0103926 A1* | 5/2006 | Meyers et al. | 359/430 |
| 2006/0158722 A1 | 7/2006 | Fujimoto et al. | |
| 2006/0238860 A1* | 10/2006 | Baun et al. | 359/429 |
| 2006/0284495 A1 | 12/2006 | Seo et al. | |
| 2007/0115545 A1 | 5/2007 | Chen et al. | |
| 2007/0183031 A1 | 8/2007 | Xu et al. | |
| 2008/0018995 A1* | 1/2008 | Baun | 359/399 |
| 2008/0163504 A1* | 7/2008 | Smith et al. | 33/268 |
| 2008/0168492 A1* | 7/2008 | Baun et al. | 725/37 |
| 2008/0174863 A1 | 7/2008 | Whorton | |
| 2009/0195871 A1* | 8/2009 | McWilliams | 359/399 |
| 2010/0085638 A1 | 4/2010 | Lopresti | |
| 2010/0103251 A1 | 4/2010 | Numako | |

OTHER PUBLICATIONS

A Sky Full of Stars, "Plate Solving", May 16, 2009, pp. 1-6 (retrieved on Mar. 29, 2011 from http://blog.askyfullofstars.com/tag/plate-solving/).

ACP Observatory Control Software (retrieved on Mar. 29, 2011 from http://acp.dc3.com/index2.html).

Bruccoleri, Christian, et al., "Toward Ground-Based Autonomous Telescope Attitude Estimation Using Real Time Star Pattern Recognition", Texas A&M University, 2004, pp. 1-12.

Dong, Ying, et al., "Brightness Independent 4-Star Matching Algorithm for Lost-in-Space 3-Axis Attitude Acquisition", Tsinghua Science and Technology, ISSN 1007-0214 08/18 pp. 543-548, vol. 11, No. 5, Oct. 2006.

Harvey, Chris, "New Algorithms for Automated Astrometry", University of Toronto, 2004, p. 1-93.

Hogg, David W., et al., "Automated Astrometry", Astronomical Data Analysis Software and Systems XVII, ASP Conference Series, vol. 394, 2008, pp. 27-34.

Samaan, Malak A., et al., "Nondimensional Star Identification for Uncalibrated Star Cameras", The Journal of the Astronautical Sciences, vol. 54, No. 1, Jan.-Mar. 2006, pp. 1-17.

Lang, Dustin, et al., "Blind astrometric calibration of arbitrary astronomical images", Astrometry.net, Oct. 12, 2009, pp. 1-55.

Cole, Gary M., "Automating a Telescope for Spectroscopy", The Society for Astronomical Sciences 27th Annual Symposium on Telescope Science, 2008, pp. 103-108.

Edgar, James, "The Saskatchewan Millennium Telescope", Journal of the Royal Astronomical Society of Canada, Jun. 2002, pp. 91-95.

Gerszewski, Michael T., "The hardware and software design of the asteroid and comet Internet telescope", University of North Dakota, 2002, pp. 1-112.

Kubanek, Petr, "RTS2—The Remote Telescope System", Hindawi Publishing Corporation, Advances in Astronomy, vol. 2010, Jan. 29, 2010, pp. 1-9.

* cited by examiner

SYSTEM AND METHOD FOR AUTOMATICALLY ALIGNING A TELESCOPE WITHOUT REQUIRING USER INTERVENTION

CROSS-REFERENCE TO RELATED APPLICATION

This invention is related to U.S. patent application Ser. No. 12/983,065 for "Determining Celestial Coordinates for an Image", filed on the same date as the present application. The related application is incorporated herein by reference.

FIELD OF THE INVENTION

The present invention relates to methods and systems for automatically aligning a telescope to point to a desired celestial location.

DESCRIPTION OF THE RELATED ART

Many telescopes are capable of automatically pointing to particular coordinates given in terms of right ascension and declination, and/or to specified celestial objects by looking up the celestial coordinate locations of such objects in a database. Such operations are usually enabled by the use of a specialized motor-driven mount and associated software for controlling the positioning of the mount via a microprocessor or other control device. Such an apparatus is generally referred to as a "GoTo" mount.

In general, in order to function properly, GoTo mounts must be aligned before use. The positions of celestial objects relative to the telescope's internal coordinate system (primary and secondary axis positions) generally vary depending on geographic location, time, and date, as well as on the telescope's initial position. Accordingly, in general, accurate GoTo pointing operations cannot take place until the telescope has been properly aligned. Once the alignment has been performed, the telescope is able to translate its own internal coordinate system (primary and secondary axis positions) to the celestial coordinate system (right ascension and declination) and vice versa. The telescope can then accept input for a GoTo operation and can respond by pointing to the desired object or specified coordinates.

Conventional GoTo mounts generally perform alignment by reference to a known location and/or date/time, as well as one or more reference objects, such as particular celestial objects. Thus, in order to align a conventional mount, a user is generally required to input local date, time and location, and to manually point the telescope toward the reference object, which may be for example a particular star (referred to as an "alignment star"). In some cases, two or more alignment stars are used, so as to improve accuracy. Knowledge of the actual location of the alignment star(s) in right ascension and declination, as well as local time and date, enables the telescope to generate a transform that defines a relationship between internal coordinates and celestial coordinates.

Various GoTo mounts have different alignment techniques. Some require the user to manually center certain reference stars in the eyepiece, so that alignment can be performed with respect to these reference stars. Others require time and location information to be manually input or determined via Global Positioning System (GPS) or other methods, and/or the sensing of bright stars.

McWilliams, U.S. Patent Publication No., US2004/0233521 A1, entitled "Automatic Telescope", published Nov. 25, 2004, describes an automatic telescope that does not require user input of time and/or location. The telescope aligns itself by scanning the sky for two or more bright stars that are used as alignment references. Although such a telescope may not require user input of time and/or location, its method of operation can require multiple sensing iterations, including image capture and analysis, in order to locate sufficiently bright reference stars. The requirement for independent bright reference stars can increase the time to achieve an alignment, and can cause the apparatus to fail to align in situations where it is not possible to detect a sufficient number of bright reference stars. In addition, such a technique requires that the apparent magnitudes of stars be compared with one another so that bright stars can be detected.

Some self-aligning telescopes utilize GPS for time and location acquisition, combined with a digital compass and an accelerometer-based level-sensing apparatus to orient the mount during initial alignment. An example of a supplier of such telescopes is Meade Instruments Corp. of Irvine, Calif. However, these telescopes can introduce additional complexity and cost, as the final product must include such components as the GPS, digital compass, accelerometer, and image capture devices. Finally, at least some telescopes of this type use star brightness in their determination of the alignment reference position, which introduce similar limitations to those discussed above in connection with McWilliams.

SUMMARY

According to various embodiments of the present invention, there is provided a system and method of automatically aligning a telescope without requiring knowledge of actual local time or geographic location (latitude and longitude), and without relying on sensing bright stars or relative (or absolute) star magnitudes; accordingly, the system and method of the present invention are able to operate in situations where such bright stars are not visible. In addition, according to various embodiments, the techniques of the present invention address the problems and limitations of conventional self-alignment methods, and do not require user intervention or substantial additional equipment such as GPS systems, digital compasses, and accelerometers.

In one embodiment of the present invention, a telescope is aligned by generating a mathematical transform, also referred to as a "mount model". The mount model is a coordinate transformation that defines the relationship between a telescope's internal coordinate system and a celestial coordinate system. Initially, according to the techniques described herein, the mount model is generated using an arbitrary time and date, arbitrary telescope location (specified, for example, as longitude and latitude), and a number of alignment reference points (such as, for example, three alignment reference points). The alignment reference points are a set of captured data for some number of positions of the telescope. An initial mount model is generated based on data corresponding to these alignment reference points, each including an arbitrary local sidereal time (LST) (a celestial time reference associated with the location of observation) and an internal telescopic coordinate reference (based, for example, on internal motor positioning routines).

In one embodiment, the system and method of the present invention is able to operate without knowledge of the actual local time and location. An initial LST is derived from the arbitrary time and location (for example, using the arbitrary local time and arbitrary longitude to calculate the initial LST). The arbitrary time and location can be initialized from pre-programmed values, if desired. Initial values of LST and latitude are successively refined using an iterative process that measures pointing error between expected and observed star locations, as described below. The iterative process generates an LST offset, representing the difference between actual LST at the location and LST calculated from the initial arbitrary time and longitude.

In one embodiment, the system and method operate as follows. A star field is captured, for example using an image capture device such as a camera. A matching process is performed to attempt to match stars in the captured field with known patterns of stars. This step, which is referred to as "plate solving", yields a mathematical transform that relates pixel coordinates of an image with celestial coordinates in right ascension and declination. No relative brightness determination is needed. Based on the mathematical transform and on the LST derived from the arbitrary time and location, an initial mount model is generated.

Because the actual time and location are not used, it is expected that there will be a measurable error in the pointing model due to the LST offset (difference between actual LST and LST derived from the initial arbitrary time and location) and the latitude error (difference between actual latitude and initial arbitrary latitude). In one embodiment, in order to generate an accurate mount model, the LST and latitude are corrected via an iterative process, as described herein.

The degree of error in the initial mount model is determined, for example using root-mean-square (RMS) calculation and/or some other statistical error measurement technique, based on observation of some number of alignment reference points. This RMS pointing error represents the accuracy of the determined coordinate transformation, and reflects an indication of error in the initial LST and/or latitude values with respect to the alignment reference points. Iterative adjustment is performed, wherein offset adjustments are successively added to the LST of each alignment reference point, and/or wherein the latitude of the mount model is successively corrected. Pointing errors are measured at each iteration. Results are evaluated so as to arrive at a minimized RMS pointing error with respect to the alignment reference points. A final accumulated LST offset is determined, representing the difference between actual LST and LST derived from the initial arbitrary time and location. This LST offset is saved, for application to any LST calculations, and the corrected latitude is retained in the mount model.

In one embodiment, a two-phased approach for deriving the LST offset and latitude correction is applied. In a first phase, offsets of one hour are applied to LST values for each of the alignment reference points, so as to arrive at a coarse approximation of the mount model. Subsequently, a second phase is performed, wherein the LST offset (and/or the latitude) is/are fine-tuned to further minimize RMS pointing error, to arrive at the final LST offset and latitude values.

Once RMS pointing error has been minimized, LST offset and latitude have been determined with sufficient accuracy so that the telescope has been aligned. Actual LST can be determined by applying the LST offset to the LST derived from the initial arbitrary time and location, and the mount model can then be used for GoTo pointing operations.

Thus, the iterative optimization process of the present invention replaces the need for a GPS, and further avoids the need for the user to manually provide the local time and location. In this manner, the system and method of the present invention provide a technique for aligning a telescope without requiring manual user input and without introducing a need for significant additional hardware at added expense. In addition, the system and method of the present invention do not require time, location, or relative star brightness information to perform telescope alignment. In addition, the system and method of the present invention do not require any alignment to a local horizon coordinate system, and indeed do not require that true horizon coordinates be known.

The techniques of the present invention can be implemented with an altitude-azimuth mount, wherein the axes of rotation are approximately aligned to the horizon coordinate system, or an equatorial mount, or any other type of mount.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Figure 1:
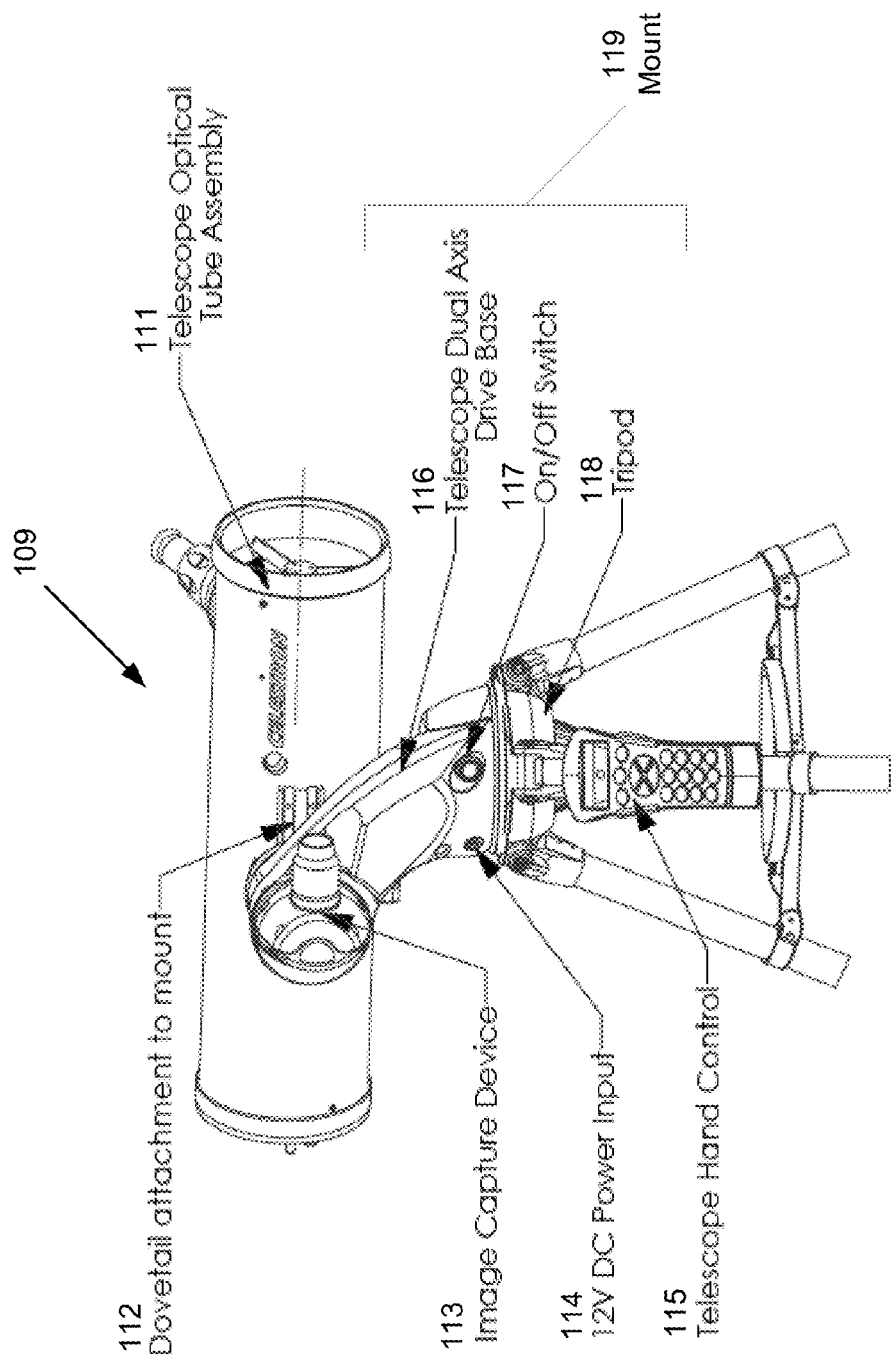
FIG. 1 is a diagram depicting a self-aligning telescope according to one embodiment of the present invention.

For purposes of the description provided herein, all references to "time" can be considered to refer to both "date and time", where appropriate.

System Architecture

According to various embodiments, the present invention can be implemented within a telescope or other device for generating or capturing celestial images, and/or within a mount or other apparatus for controlling and adjusting the positioning of such a telescope. According to other embodiments, the present invention can be implemented within a computing device or other electronic device that can be communicatively coupled with a telescope or other imaging device, for example to send signals to a microcontroller for controlling and adjusting the positioning of the telescope.

According to other embodiments, the present invention can be implemented in a device that is mechanically coupled to a telescope and which adjusts the position of the telescope, for example by mechanical coupling with the telescope mount. A mechanical bracket can be used for such mechanical coupling. By implementing the invention in such a device, the system of the present invention can operate in connection with an existing mount and telescope. Users can then purchase the system of the present invention for use with their existing equipment. For example, in such an embodiment, the system of the present invention can use existing GoTo electronics of the telescope and/or mount, with additional functionality as described herein.

The present invention can be used for alignment of any type of telescope or combination of telescopes, including but not limited to optical telescopes, radio telescopes, x-ray telescopes, gamma ray telescopes, arrays of telescopes, and the like. The present invention can also be used for alignment of any other type of device for observing celestial objects.

The invention can be implemented on a stand-alone electronic device, or on a plurality of electronic devices communicatively coupled with one another, such as for example in a client/server environment wherein some components are client-based and other components are server-based. Each such electronic device may be, for example, a personal computer, handheld computer, personal digital assistant (PDA), kiosk, cellular telephone, or the like. An electronic network enabling communication among two or more electronic devices may be implemented using well-known network protocols such as Hypertext Transfer Protocol (HTTP), Secure Hypertext Transfer Protocol (SHTTP), Trans-mission Control Protocol/Internet Protocol (TCP/IP), and/or the like. Such a network may be, for example, the Internet or an Intranet. For example, the invention can be used to adjust a telescope based on celestial data provided from a local source, such as a local storage device, and/or based on celestial data from a star databases located at a server which may be local or remote with respect to the telescope. Alternatively, the techniques described herein can be implemented on any other type of computing device, combination of devices, or platform. Any or all of such devices can, in one embodiment, operate under the direction and control of software.

Although the invention is described herein in the context of telescopes and other devices for observing celestial objects, one skilled in the art will recognize that the techniques of the present invention can be implemented in other contexts, and indeed in any context in which it is desired to align an imaging device or optical device. Accordingly, the following description is intended to illustrate various embodiments of the invention by way of example, rather than to limit the scope of the claimed invention.

In one embodiment, the present invention is implemented as a software application running on a computing device, consumer electronic device, telescope, imaging device, or the like. The software application may be a desktop application or a web-based application that is accessible via a browser such as Microsoft Internet Explorer, available from Microsoft Corporation of Redmond, Wash., or by a specialized web-based client application. In one embodiment, for example, the software application runs on a personal computer or other device that is communicatively coupled with a microcontroller for adjusting the position of a telescope or telescope mount.

The invention can operate in connection with live images (i.e., images as they are being captured) and/or previously captured images with associated telescope position and LST values. Images can be provided in any form, whether electronic, optical, photographic, or the like. The terms "digital image" and "plate" herein are used herein for ease of nomenclature, and no limitation to particular forms or media is intended or should be implied.

Referring now to FIG. 1, there is shown a diagram depicting a self-aligning telescope 109 according to one embodiment of the present invention. The invention can be implemented in telescope 109 as a stand-alone unit, or in communication with a separate electronic device for controlling the adjustment of telescope 109. The particular depiction shown in FIG. 1 is merely exemplary and is not intended to limit the scope of the claimed invention.

In one embodiment, telescope 109 includes optical tube assembly 111 which can be of any known type, including reflecting, refracting, or catadioptric. Telescope can include any known image capture device 113, such as for example a charge-coupled device (CCD) camera, complementary metal-oxide semiconductor (CMOS) camera, active-pixel sensor (APS) camera, or the like. Telescope 109 is attached to mount 119 via attachment 112, which may for example be a dovetail attachment. In one embodiment, mount 119 is electrically controlled by a microcontroller (not shown in FIG. 1), so that it can be adjusted automatically in accordance with the techniques described herein. In one embodiment, mount 119 includes power input jack 114, which may be, for example, a 12-volt direct current (DC) power input jack; keypad 115 for user input of commands and data to control telescope 109; and on/off switch 117. In one embodiment, mount 119 sits on tripod 118 for stability.

In one embodiment, mount 119 includes dual-axis drive base 116 which permits movement of telescope 109 along two axes, thus facilitating automatic alignment according to the techniques described herein. One skilled in the art will recognize that the techniques of the present invention can be implemented with any type of drive base.

Mount 119 may be of any type, including for example an altitude-azimuth mount, wherein the axes of rotation are approximately aligned to the horizon coordinate system, or an equatorial mount, or any other type of mount 119.

In one embodiment, telescope 109 includes an internal clock (not shown in FIG. 1), for keeping track of time with respect to an arbitrary local sidereal time, as described in more detail below.

Figure 2:
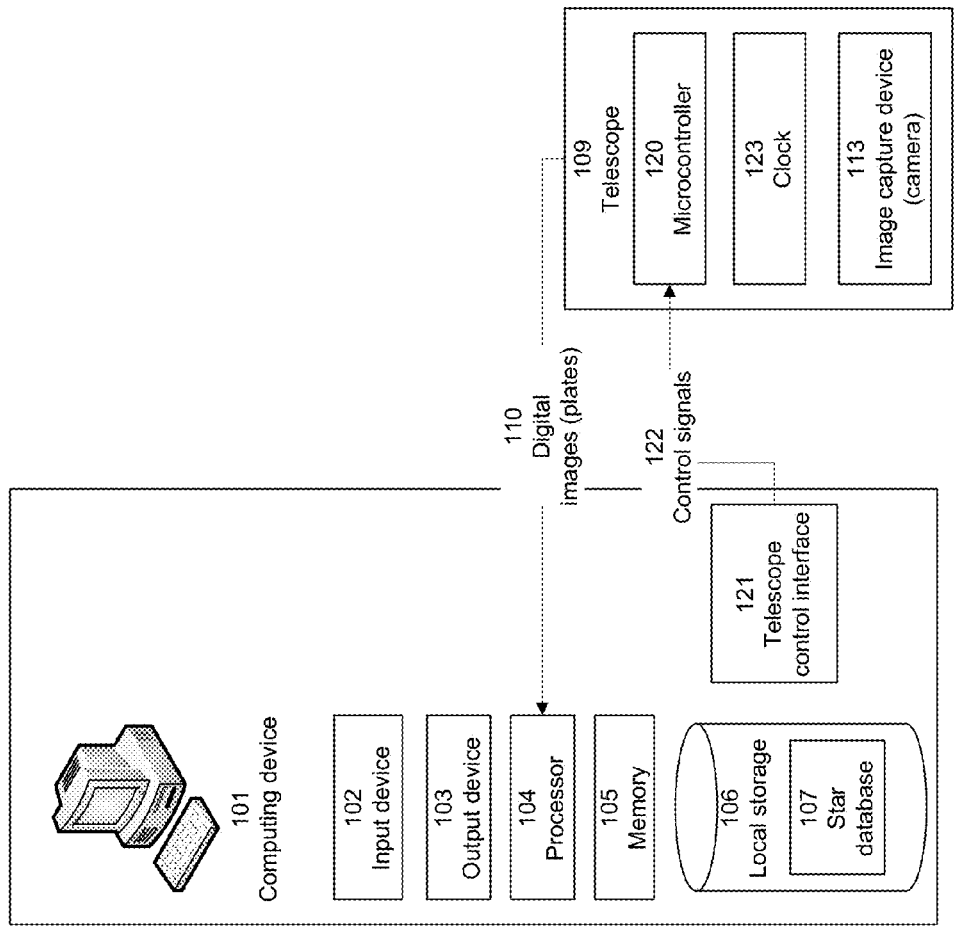
FIG. 2 is a block diagram depicting an architecture for implementing a self-aligning telescope in connection with a computing device, according to one embodiment of the present invention.

Referring now to FIG. 2, there is shown a block diagram depicting an architecture for implementing a self-aligning telescope 109 in connection with a computing device 101, according to one embodiment of the present invention. Such an architecture can be used, for example, for implementing the techniques of the present invention in connection with a stand-alone software application running on a computer or other computing device communicatively coupled to telescope 109 or other imaging device. In one embodiment, the system of the present invention operates, in part, by analyzing images captures by telescope 109. Accordingly, telescope 109 provides image 110 via any known communications mechanism, whether wired or wireless. Image 110 may be a digital image, photographic image, optical image, or any other type of image; image 110 is variously referred to herein as an "image", "digital image", or "plate", but usage of such various terms should not be considered to limit the scope of the invention to any particular type or format of image.

Computing device 101 may be any electronic device adapted to run software; for example, computing device 101 may be a desktop computer, laptop computer, personal digital assistant, smartphone, music player, handheld computer, tablet computer, kiosk, game system, or the like. Alternatively, computing device 101 can be a component of telescope 109 itself, either bundled with telescope 109 or purchased as an add-on. In one embodiment, computing device 101 is a desktop computer running an operating system such as Microsoft Windows, available from Microsoft Corporation of Redmond, Wash., or a smartphone such as the Apple iPhone, available from Apple Inc. of Cupertino, Calif., or a tablet computer such as the Apple iPad, available from Apple Inc. of Cupertino, Calif.

In one embodiment, computing device 101 comprises a number of hardware components as are well known to those skilled in the art. Input device 102 can be a keyboard, mouse, touchscreen, trackball, trackpad, five-way switch, voice input device, joystick, and/or any combination thereof. Output device 103 can be a screen, speaker, printer, and/or any combination thereof. Processor 104 can be a conventional microprocessor for performing operations on data under the direction of software, according to well-known techniques. Memory 105 can be random-access memory having a structure and architecture as are known in the art, for use by processor 104 in the course of running software. Local storage 106 can be any magnetic, optical, and/or electrical storage device for storage of data in digital form; examples include flash memory, magnetic hard drive, CDROM, and/or the like. In one embodiment, local storage 106 includes star database 107, which contains information describing the positions of celestial objects, for use in connection with the present invention to align telescope 109, as described in more detail herein.

Computing device 101 includes telescope control interface 121, which sends control signals 122 to microcontroller 120 of telescope 109, in order to perform automatic alignment of telescope 109. Microcontroller 120 can be implemented as any electronic and/or mechanical device for changing the position of telescope 109 in accordance with control signals 122. In one embodiment, control signals 122 are sent over a wired connection; in another embodiment, they are sent wirelessly. In various embodiments, microcontroller 120 is designed or equipped to receive control signals 122 and position telescope 109 accordingly.

In one embodiment, telescope 109 includes internal clock 123, for keeping track of time with respect to an arbitrary local sidereal time, as described in more detail below. In one embodiment, telescope 109 includes image capture device 113, such as a camera, for capturing images 110 for example in digital, optical, video, and/or photographic form.

One skilled in the art will recognize that the particular arrangement of hardware elements shown in FIG. 2 is merely exemplary, and that the invention can be implemented using different hardware elements configured in any of a number of different ways. Thus, the particular architecture shown in FIG. 2 is merely illustrative and is not intended to limit the scope of the claimed invention in any way.

Figure 3:
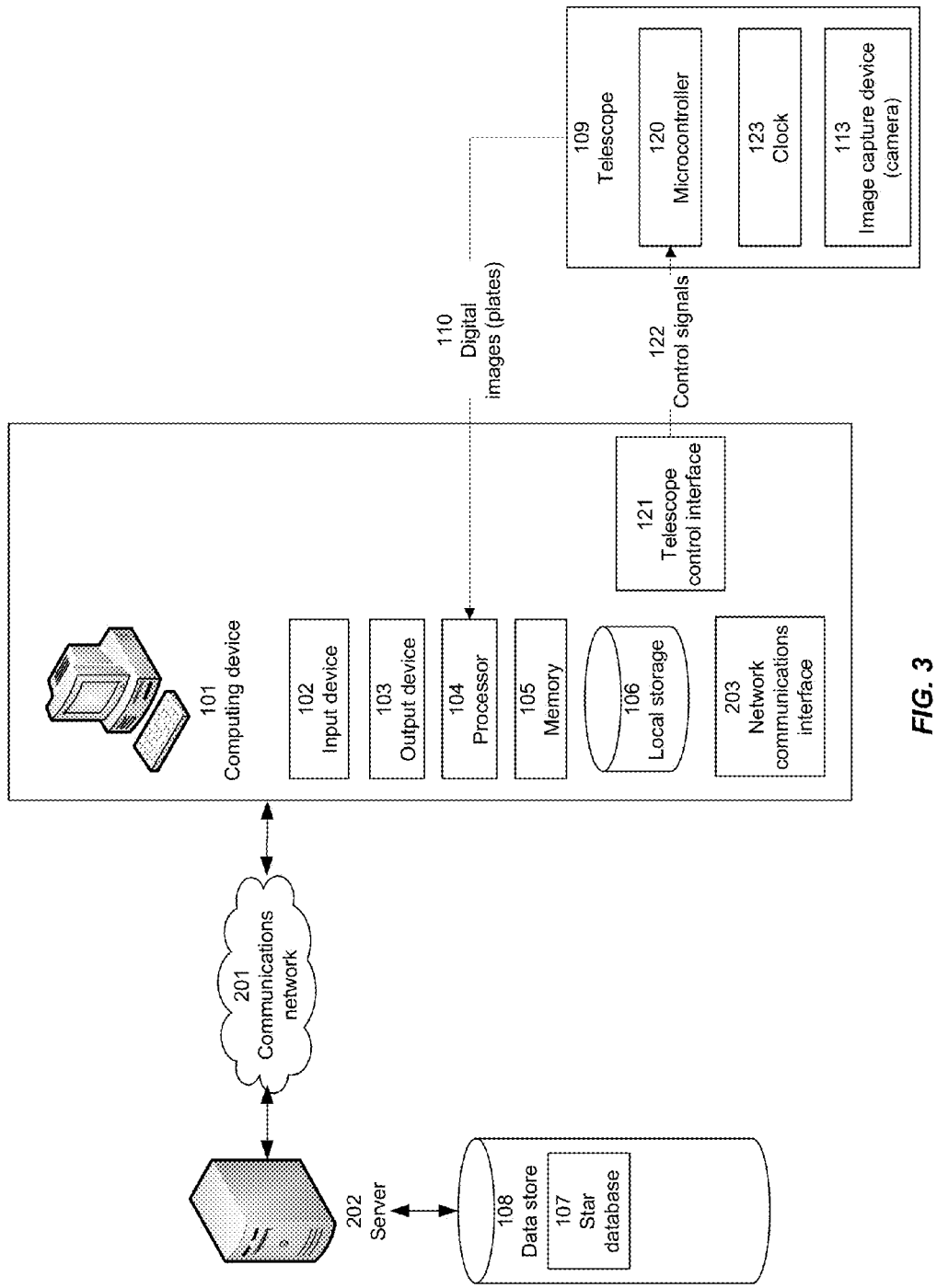
FIG. 3 is a block diagram depicting an architecture for implementing a self-aligning telescope in connection with a client/server apparatus, according to one embodiment of the present invention.

Referring now to FIG. 3, there is shown a block diagram depicting a hardware architecture for practicing the present invention in a client/server environment according to one embodiment of the present invention. Such an architecture can be used, for example, for implementing the techniques of the present invention in connection with a web-based application for aligning telescope 109. In one such embodiment, processor 104 runs browser software according to well known mechanisms.

Network communications interface 203 is an electronic component that facilitates communication of data to and from other computing devices over communications network 201. Communications network 201 can be the Internet or any other electronic communications network.

Server 202 communicates with computing device 101 over network 201, and in one embodiment can be located remotely or locally with respect to computing device 101. In one embodiment, server 202 is associated with data store 108, which contains star database 107 including information describing the positions of celestial objects, for use in connection with the present invention to align telescope 109, as described in more detail herein. Thus, in various embodiments, star database 107 can be located at server 202 or at computing device 101. In one embodiment, star database 107 (or some portion thereof) can be transmitted to computing device 101 as part of a client/server session, to improve responsiveness and performance.

One skilled in the art will recognize that the present invention may be implemented using a distributed software architecture if appropriate. One skilled in the art will further recognize that the client/server architecture shown in FIG. 3 is merely exemplary, and that other architectures can be used to implement the present invention, including architectures that are not necessarily web-based. Thus, the particular architecture shown in FIG. 3 is merely illustrative and is not intended to limit the scope of the invention in any way.

Mount Model

The alignment method of the present invention generates a mount model that telescope 109 can use for translating between an internal coordinate system (expressed, for example in terms of positions along primary and secondary axes) and a celestial coordinate system (expressed, for example in terms of right ascension and declination). The mount model is generated by capturing some number of alignment reference points (such as, for example, three alignment reference points) relating the internal coordinate system, along with a time reference in terms of local sidereal time (LST), and the celestial coordinate system for a number of positions. This information, taken with local LST and geographic (latitude and longitude) information about the observation location, yields a mount model that mathematically relates internal coordinates and celestial coordinates.

Once the mount model has been generated, telescope 109 can be used for GoTo operations wherein the user instructs telescope 109 to point to particular celestial coordinates or to a particular celestial object. The mount model is, in one embodiment, expressed as a mathematical transform that defines the relationship between the internal coordinate system of telescope 109 and the celestial coordinate system.

The relationship between internal coordinates and celestial coordinates depends on the local time and location. The relationship changes with the passage of time, due to the rotation of the earth; this apparent motion of celestial objects (such as stars) is referred to as sidereal motion. As a result, for a given celestial coordinate, the internal coordinates representing telescope 109 position changes over time.

As mentioned above, the mount model is determined based, in part, on LST. LST is the hour angle of the vernal equinox at a given location. It can also be expressed as the right ascension of the meridian dividing the east and west halves of the celestial sphere at a given location. LST can be derived for a particular observation location, for example, based on local time at the location, time zone at the location, and longitude at the location. From the local time and time zone, it is possible to calculate Universal Time (UT). UT and the longitude of the observation location are used to derive LST by calculating the offset from UT based on the longitude (every 15 degrees of longitude is equivalent to one hour of offset).

The mount model also takes into account the latitude of the observation location. In one embodiment, the relationship specified by the mount model is based on the following equations, which calculate right ascension and declination $(\alpha,\delta)$ of the celestial coordinates from the horizon coordinates azimuth and altitude (A,h):

Local Sidereal Time (LST): $\theta=\theta_a-L$ (Eq. 1)

Right Ascension:

$$\alpha = \theta_\Box - \tan^{-1}\left(\frac{\sin A}{\cos A \sin\varphi + \tan h \cos\varphi}\right)$$ (Eq. 2)

Declination: $\delta=\sin\phi \sin h-\cos\phi \cos h \cos A$ (Eq. 3)

Where:
$\theta_a$=Sidereal Time at Greenwich
L=Observer's Longitude
$\phi$=Observer's Latitude
h=altitude; positive above horizon, negative below
A=azimuth; measured westward from South.

These equations are for a telescope having an "ideal" alt-azimuth mount. However, they can be adapted for "non-ideal" alt alt-azimuth mounts, or equatorial mounts, by taking into account offsets in the axis of rotation between the non-ideal coordinate system and the celestial coordinate system.

In order to apply the above equations to translate between celestial and telescopic coordinates, the following information is generally used:
horizon coordinates;
local time and time zone (from which UT can be determined, and sidereal time at Greenwich $\theta_a$ can be calculated;
observer's longitude L (from which LST $\theta$ can be calculated, via Eq. 1);
observer's latitude $\phi$ (from which right ascension and declination) $(\alpha,\delta)$ can be calculated, via Eqs. 2 and 3).

In various embodiments, the mount model of the present invention can also correct for various imperfections in telescope 109, according to techniques that are well known in the art. Such errors include, for example, an offset in the coordinate system from the setup of the telescope, errors in the orthogonality of the axes, flexure in the mechanics of the mount, errors in gear trains, atmospheric refraction, and the like. Such error correction techniques are not discussed in detail here, as they are not required in order to practice the present invention.

Using the above equations, and given alignment reference points that are each associated with a local sidereal time, celestial coordinates, and telescopic coordinates, it is possible to derive the mathematical transform that defines the mount model.

In one embodiment of the present invention, the mount model is generated without requiring knowledge of the actual time and location. Rather, an arbitrary time and location are used. An LST, referred to herein as "arbitrary LST", is initially calculated for each alignment reference point, based on the arbitrary time and location. The mount model is generated using the above-described techniques, using the arbitrary LST and location, with a recognition that some initially unknown LST offset exists between actual LST and the arbitrary LST. A mathematical transform is derived; however, the transform is generally inaccurate owing to the difference between the arbitrary LST and actual LST (i.e., the LST offset) and further owing to the different between the arbitrary latitude and the actual latitude (i.e., the latitude error). As a result, a transformation of telescopic coordinates to celestial coordinates using the derived transform will generally produce pointing errors, and/or potentially errors in other parameters of the mount model. According to one embodiment, the transform is iteratively adjusted based on measurement of pointing errors until a sufficiently accurate mount model is generated.

In one embodiment, multiple linear regression is employed in order to iteratively reduce the pointing error. For example, in one embodiment, an RMS pointing error for the initial mounting model is measured; this RMS pointing error describes the accuracy of the mount model given the alignment points used, along with the individual pointing error for these alignment points. In one embodiment, the estimated north/south polar misalignment (or latitude error) can also be measured. The latitude angle at a location corresponds to the angle of the polar axis of rotation from the horizon at a given location.

Statistical feedback information derived from the alignment process provides visibility into the effects of the LST offset and/or latitude error. Adjustments can then be made, for example by changing parameters such as LST offset and/or latitude, in order to refine the accuracy of the model in an iterative manner. With each iteration, a new LST offset adjustment and new latitude adjustment are determined, and a new RMS pointing error is calculated. The iterative process proceeds, with adjustments being made based on measurement of expected positions of celestial objects with actual observed positions. The goal is to reduce RMS pointing error, and by doing so, determine 1) the actual LST offset between initial arbitrary LST and actual LST for the observation location, and 2) the correct actual latitude for the observation location. By making successive adjustments in this manner, the system of the present invention is able to generate LST and latitude values that approach actual values. Once the RMS pointing error is determined to be sufficiently small, the process ends.

The RMS pointing error represents the accuracy of the coordinate transformation. In one embodiment, the iterative process used by the present invention to minimize the RMS pointing error produces LST offsets and a corrected latitude that closely approximate the actual LST and the actual latitude of the observation location.

In one embodiment, the iterative process generates both an LST offset and a latitude value.

To arrive at the LST offset, LST offset adjustments are successively applied to a working value of the LST offset, effectively moving the LST of an alignment reference point around so that changes in RMS pointing error can be observed, and so that RMS pointing error can be minimized.

The iterative process also generates a latitude value. Since the initial latitude is set at an arbitrary value, this initial latitude is typically incorrect and does not reflect the actual location of the observer. When alignment reference points are added, this incorrect latitude produces errors in the expected pointing accuracy of the model (RMS pointing error), as well as the reported accuracy of the alignment references. The mount model may report what appears to be a polar misalignment, which is actually attributable (at least in part) to latitude error. Reprogramming the latitude value in the mount model produces an observable change in the RMS pointing error. This adjustment in latitude can be performed iteratively, along with the iterative adjustment of LST offset, so as to reduce RMS pointing error and arrive at an improved mount model.

Initialization

Figure 5:
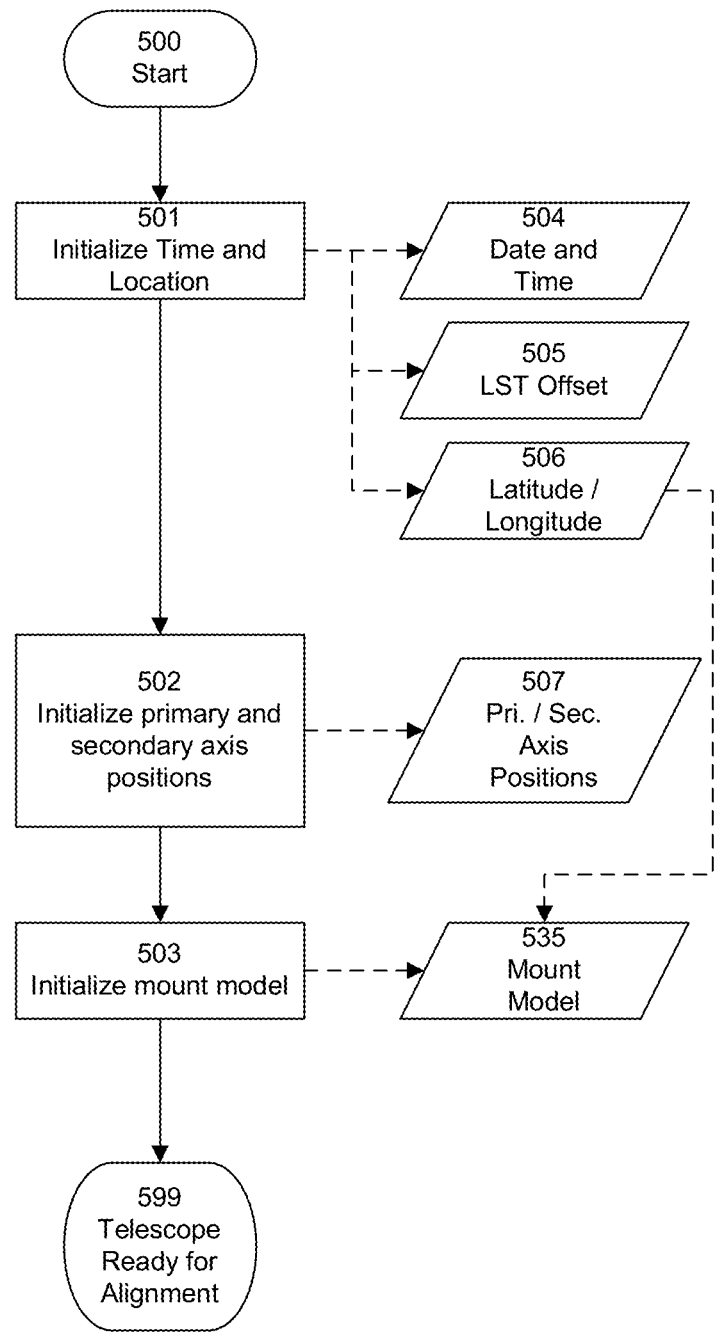
FIG. 5 is a flow diagram depicting a method for initializing a telescope according to one embodiment of the present invention.

In one embodiment, telescope 109 is initialized upon power-up, in order to make it ready for automatic alignment. Referring now to FIG. 5, there is shown is a flow diagram depicting a method for initializing telescope 109 according to one embodiment of the present invention. The method of FIG. 5 can be used in connection with telescope 109 as depicted in FIGS. 1, 2, and/or 3, although one skilled in the art will recognize that the method can also be practiced with other types of apparatus of different designs. The use of the word "telescope" in the descriptions provided herein is for ease of nomenclature only, and should not be construed as limiting the invention to operating solely with telescopes; to the contrary, the techniques of the present invention can be implemented in connection with any device for capturing or viewing images.

The method begins 500. In one embodiment, the steps of FIG. 5 are performed when telescope 109 is initially powered on. In other embodiments, the steps may be performed when the user presses a Reset button (not shown), or when some other problem or condition occurs which indicates that initialization should take place. Some steps may be performed at different stages after being powered on, as when a user initiates an automatic alignment.

Telescope 109 initializes 501 its time and location. In one embodiment, there is no requirement for telescope 109 to use actual current time and location. Rather, the techniques of the present invention can be implemented using any arbitrary time and location. For purposes of the description provided herein, "time" can refer to "date and time". Thus, in one embodiment, the result of step 501 includes initial values for date and time 504, LST offset 505, and location (expressed, for example, as latitude/longitude 506).

The primary and secondary axis positions 507 of telescope 109 are initialized 502. In one embodiment, the primary axis is initialized to zero, based on the current arbitrary orientation of telescope mount 119. In one embodiment, the secondary axis is initialized according to a limit sensor for an approximate level position, and a range of motion protection. In some mounts, a limit switch is used to manage the limits of travel, such as for example to specify limits of five degrees below horizontal, and five degrees deviation from vertical. In one embodiment, the system of the present invention assumes an approximate level position by determining the lowest permissible position and measuring upwards by five degrees. One skilled in the art will recognize that other values may be used depending on the particular characteristics of the mount and telescope 109.

Mount model 535 is initialized 503 using the initialized latitude/longitude values 506, date and time 504, and LST offset 505.

As described herein, in one embodiment the system of the present invention is able to perform alignment for telescope 109 in the absence of actual local time and location information. Thus, for each alignment reference point, the alignment methodology uses LST derived from an arbitrary time and location. This arbitrary time and location as initialized in steps 501 and 502 may be pre-programmed, for example to some fixed value, such as a time/date of to Jan. 1, 2010 at 6:00 PM, and a location of 33° 50' 41" latitude, and 118° 20' 17" longitude. One skilled in the art will recognize that any arbitrary time and location can be used. As described herein, the arbitrary time and longitude are used to calculate the LST; additionally, the latitude may be used in the mount model for certain calculations. In one embodiment, telescope 109 (and/or computing device 101) uses internal clock 123 to keep track of elapsed time with respect to the arbitrary initialized time, for alignment operations.

Once initialization steps 501, 502, and 503 are completed, telescope 109 is ready 599 for alignment according to the techniques described herein.

Overview

Figure 4:
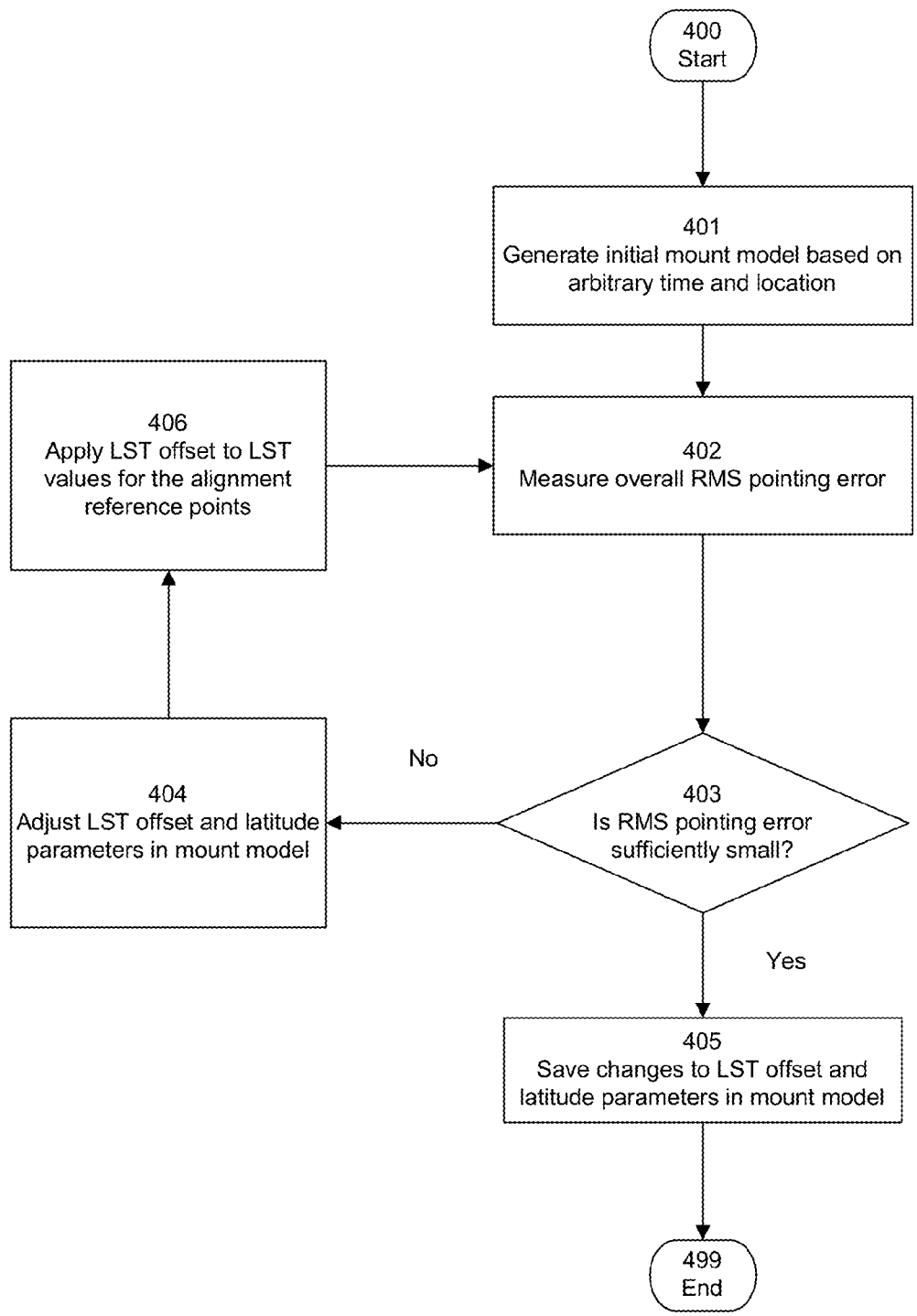
FIG. 4 is a flow diagram depicting an overview of a method for automatically aligning a telescope according to one embodiment of the present invention.

Referring now to FIG. 4, there is shown a flow diagram depicting an overview of a method for automatically aligning telescope 109 according to one embodiment of the present invention. FIG. 4 depicts a feedback loop that is employed to make adjustments in an iterative fashion, based on measured RMS pointing error, so as to refine the mount model until a sufficient level of accuracy is achieved with respect to LST offset and corrected latitude.

The method begins 400. An initial mount model is generated 401, based on an arbitrary time and location. An overall RMS pointing error is measured 402, for example based on observed pointing errors for some number of alignment reference points. In one embodiment, overall RMS pointing error is measured 402 by adjusting LST offset for each alignment reference and/or adjusting the latitude programmed to the mount model, to produce a measurement of the overall pointing accuracy and mount model accuracy. If, in step 403, the overall RMS pointing error is sufficiently small (for example, smaller than some threshold value), changes are saved 405 to the LST offset and latitude parameters in the mount model, and the method ends 499. If, in step 403, the RMS pointing error is not sufficiently small, LST offset and latitude parameters in the mount model are adjusted 406, the adjusted LST offset is applied to the LST value for each alignment reference point 404, and the method returns to step 402.

Alignment Method

Figure 6:
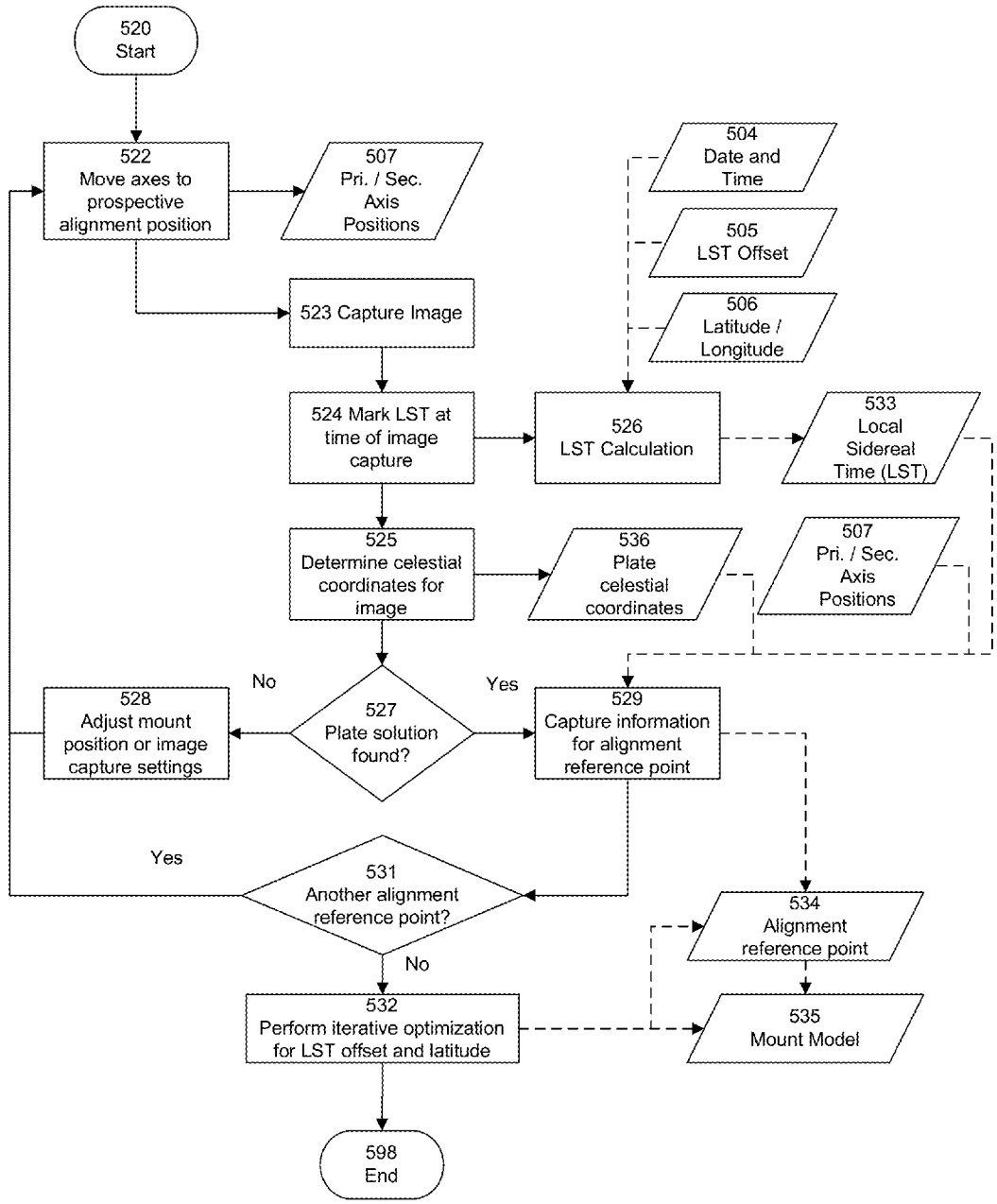
FIG. 6 is a flow diagram depicting a method for automatically aligning a telescope according to one embodiment of the present invention.

Referring now to FIG. 6, there is shown is a flow diagram depicting additional details of a method for automatically aligning a telescope according to one embodiment of the present invention.

The method begins 520. Primary and secondary axes 507 of telescope 109 are moved 522 to a prospective position for an alignment reference point. For example, in one embodiment, a position is selected to be sufficiently far away from previously captured alignment reference points, in terms of azimuth and altitude. In one embodiment, the selection of prospective position takes in to account any failed alignment reference point capture attempts if any. For example, the method might select prospective positions such as (expressed in azm,alt):

step 1: (+5, +26),
step 2: (+52, +105); and
step 3: (+68, +205).

However, prospective positions for successive steps can be adjusted if, for example, step 1 fails to provide a suitable alignment reference point. In general, any suitable position containing visible sky can be selected. In one embodiment, the axes are moved 522 by controlling drive base 116 of mount 199, for example via microcontroller 120. In an embodiment including a separate computing device 101, such an operation can take place under the direction of control signals 122.

An image 110 is captured 523 at the position, for example using image capture device 113 of telescope 109. In one embodiment, image 110 is a digital image, although in other embodiments, image 110 can take any suitable form. For ease of nomenclature, image 110 is also referred to herein as a "plate".

Local sidereal time (LST) 533 at the time of the image capture 523 is marked 524. In one embodiment, the marked LST 533 does not necessarily reflect actual LST; rather it is calculated 526 from arbitrary values for date and time 504, LST offset 505, and latitude/longitude, as initialized in step 501 and/or adjusted by offset in the iterative process described herein. Marked LST 533 can also take into account elapsed time since initialization of telescope 109. In one embodiment, LST 533 is marked 524 by marking LST 533 at the start and end image capture 523, and taking the midpoint of the two marked times.

By a process known as "plate solving", the system attempts to determine 525 celestial coordinates 536 of captured image 110, for example by determining the location of some set of candidate celestial objects (such as stars) in captured image 110. In one embodiment, this is done by attempting to match the candidate stars against patterns of stars in star database 107. In one embodiment, the system of the present invention uses one or more techniques for determining celestial coordinates of an image as described in related U.S. patent application Ser. No. 12/983,065 for "Determining Celestial Coordinates for an Image", filed on the same date as the present application, the disclosure of which is incorporated herein by reference.

In one embodiment, in determining 525 celestial coordinates 536 of captured image 110, the system of the present invention takes into account any number of stars, which may include all stars that it can detect in image 110, or any portion thereof. Thus, according to one embodiment, the system does not require any brightness-sensing or brightness-comparison steps. In one embodiment, as described in the above-referenced related patent application, celestial coordinates are determined by selecting some number of stars, such as four stars (referred to as a "quad"), determining telescopic (x,y) coordinates (also known as "plate coordinates") for the selected stars, generating a signature based on coordinates for the selected stars, and searching for matches to the signature in database 107. After a matching signature is found for the quad, an approximate field and celestial location is presumed and an affine fit algorithm attempts to fit the remaining stars to a projected estimation of the field at the presumed location and field of view. Further details on this technique are described in the above-referenced related U.S. Patent Application. One skilled in the art will recognize, however, that other plate solving methods can be used in connection with the present invention.

Celestial coordinates 536 of captured image 110 are specified in terms of a mathematical coordinate transform referred to as a "plate solution". If, in step 527, a plate solution cannot be found for captured image 110, adjustments are made 528 for another attempt, and the system returns to step 523 to capture another image 110. Adjustments 528 may include, for example and without limitation, adjusting settings for the image capture device 113, moving mount 119 to a new prospective alignment position, and/or the like. In one embodiment, after some number of failed attempts, the system may quit or abandon the alignment process, or may prompt the user to move telescope 109 to another location and/or to enter some additional information manually.

If, in step 527, a plate solution can be found, the system captures 529 information from the plate solution for alignment reference point 534. In one embodiment, the captured information for alignment reference point 534 includes, for example: celestial coordinates 536 (in terms of right ascension and declination) for captured image 110; primary and secondary axis positions 507 of telescope 109 from mount 119; and LST calculated from the time of capture 504. In one embodiment, the time of capture is represented as elapsed time from clock 123 initialization. An estimate of LST 533 is generated, based on the time of capture, arbitrary location, determined celestial coordinates for captured image 110, and axis positions. Mount model 535 is then adjusted in accordance with this information 534 for the alignment reference point. Mount model 535 includes mathematical transforms for translating between telescopic and celestial coordinates. In one embodiment, mount model 535 also includes a measurement of pointing error with respect to initial arbitrary time and location 504.

In one embodiment, three alignment reference points are used, although one skilled in the art will recognize that any number can be used. If at least one more alignment reference point is to be analyzed 531, the system returns to step 522 to repeat the above-described steps for the next alignment reference point.

Once a sufficient number of alignment reference point(s) have been analyzed using the above-described steps, iterative optimization is performed 532 to adjust LST offset and latitude so as to minimize pointing errors in mount model 535 that result from the difference between the arbitrary LST and latitude and actual LST and latitude. Additional details for iterative optimization are described in connection with FIGS. 7 and 8. Once the iterative optimization has been performed 532, mount model 535 is sufficiently accurate; the method ends 598 and telescope 109 has been properly aligned.

Iterative Optimization

In one embodiment, iterative optimization 532 is performed in a twostep manner: in a first phase, referred to as Phase I, a coarse adjustment of LST offset is performed; in a second phase, referred to as Phase II, a fine adjustment of LST and/or latitude is performed.

In one embodiment, Phase I involves coarse adjustment of the LST offset of mount model 535 to within one hour of actual LST. This is done by applying 24 successive offsets, in increments of one hour each, to each of the alignment reference points. Thus, 24 prospective values of LST offset are used in this phase. For each prospective value, RMS pointing error is evaluated; the offset that generates the smallest pointing error is considered to be the best initial estimate of actual LST offset.

Figure 7:
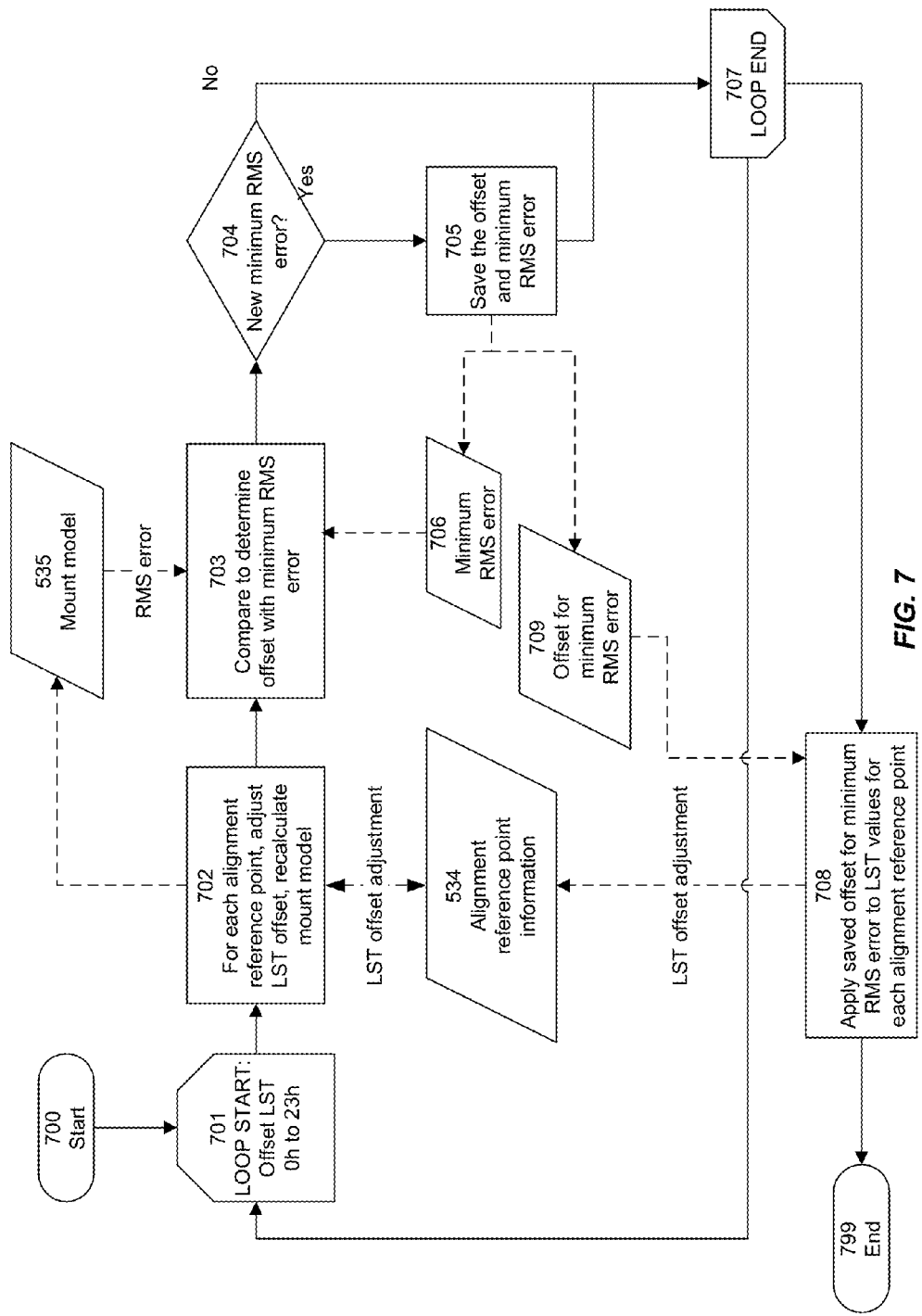
FIG. 7 is a flow diagram depicting a method for coarse adjustment of an LST offset, according to one embodiment of the present invention.

Referring now to FIG. 7, there is shown a flow diagram depicting a method for coarse adjustment of the LST offset, according to one embodiment of the present invention. The method begins 700. In one embodiment, the system performs a loop 24 times with successive offsets of LST having one-hour increments. By performing the loop 24 times, RMS pointing error for 24 offsets is obtained, corresponding to the 24 hours in a sidereal day. The output of the coarse adjustment method of FIG. 7 is to determine which LST offset results in minimum RMS pointing error. One skilled in the art will recognize that the loop can be performed with smaller or larger increments any number of times, as appropriate.

The loop begins at step 701. For each alignment reference point, the LST offset is adjusted 702 according to the current LST offset for the loop iteration, and the mount model 535 is recalculated. The RMS pointing error for mount model 535 is determined and compared 703 with any previously determined RMS pointing error. If this is the first pass through the loop, the current RMS pointing error is considered to be the minimum RMS pointing error. Otherwise, in step 704, the system determines whether the current RMS pointing error is a new minimum. If so, the system saves 705 the minimum RMS pointing error value 706 as well as the LST offset 709 corresponding to that minimum RMS pointing error value. The loop ends 707.

At the conclusion of 24 iterations of the loop, alignment reference point information 534 is updated by applying 534 the saved LST offset 709 corresponding to the minimum RMS pointing error 706 to the LST values for each alignment reference point. By applying 708 this saved LST offset 709, the method ensures that alignment reference point information 534 contains the LST offset that yields the lowest error among those offsets attempted in the coarse adjustment process. The method ends 799.

Figure 9:
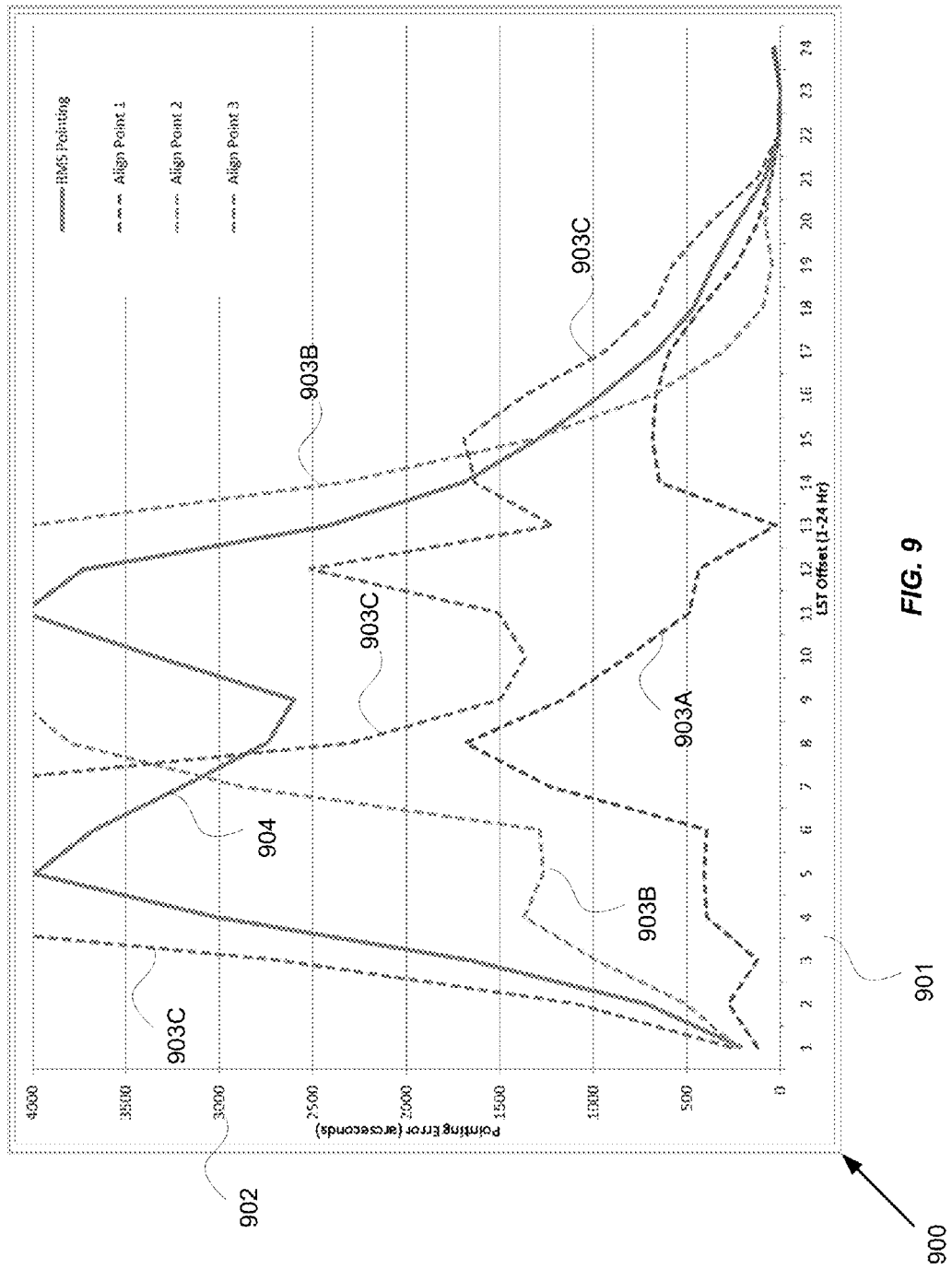
FIG. 9 is a graph depicting an example of coarse adjustment of an LST offset, according to one embodiment of the present invention.

Referring now to FIG. 9, there is shown a graph 900 depicting an example of results of a coarse adjustment of LST offset, according to one embodiment of the present invention. For each of three alignment reference points, a root-mean-square (RMS) pointing error is measured for each of 24 LST offsets, in one-hour increments. X-axis 901 represents the LST offsets, and Y-axis 902 represents the pointing error, in arc-seconds. In one embodiment, the RMS pointing error is a measure of the magnitude of the distance between the expected and actual location of the alignment reference point, in celestial coordinate space. In graph 900, plot 903A represents RMS pointing error for a first alignment reference point, plot 903B represents pointing error for a second alignment reference point, and plot 903C represents RMS pointing error for a third alignment reference point. Although three alignment point plots 903 are shown, one skilled in the art will recognize that the invention can be implemented using any number of alignment points.

Also shown in graph 900 is the total RMS pointing error 904, which is generated by aggregating the individual RMS pointing errors 903. In this example, the lowest total RMS pointing error 904 is observed at an LST offset of 22 hours. Thus, it is determined that the actual LST offset is within one hour of 22 hours, and this value is used for the next phase of optimization.

In the second phase, referred to as Phase II, further optimization is performed in an attempt to further fine-tune the LST offset to some defined degree of precision, such as, for example to within six minutes of actual LST offset. In one embodiment, in Phase II, the system of the present invention also attempts to determine actual latitude of the observation location to some defined degree of precision, such as to within 10 arc-minutes (⅙ degree). An iterative process is performed, wherein, for each iteration, the north/south polar misalignment (also referred to as the latitude error) is checked. If this misalignment is greater than some tolerance value (such as, for example, 10 arc-minutes), then the mount model's latitude is adjusted by the amount of the reported error. If the north/south polar misalignment is less than or equal to the tolerance value, then the LST offset is adjusted by 6 minutes in a positive or negative direction depending on the perceived slope of the RMS pointing error.

Iterative adjustment of latitude and LST offset causes the RMS pointing error to be successively reduced. The adjustment steps are repeated until the RMS pointing error is below some threshold acceptable value, or until further adjustment is no longer able to reduce the RMS pointing error.

Figure 8:
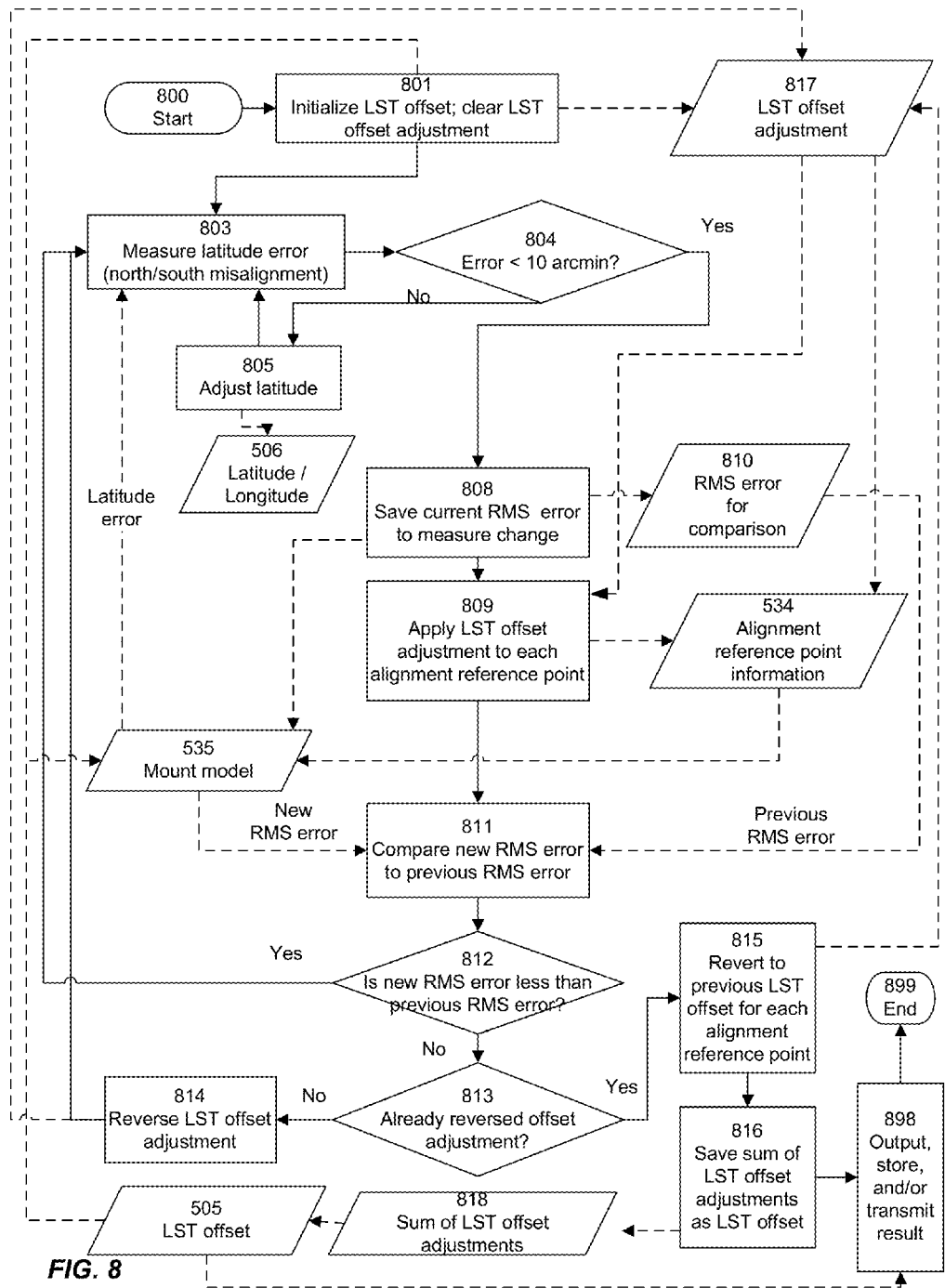
FIG. 8 is a flow diagram depicting a method for fine adjustment of an LST offset and/or latitude, according to one embodiment of the present invention.

Referring now to FIG. 8, there is shown a method for fine adjustment of LST offset and/or latitude according to one embodiment. LST offset adjustment 817 of mount model 535 is initialized 801 at some arbitrary direction and magnitude, for example at a value of +6 minutes, although any value can be used. Latitude error (north/south misalignment) of mount model 535 is measured 803 using the current LST offset. If the latitude error is less than some threshold value, such as 10 arc-minutes, then the method proceeds to step 808. If the latitude error is not less than the threshold value, then latitude is adjusted 805. Mount model 535 is recalculated with the adjusted latitude, and the method returns to step 803. For example, if initial arbitrary latitude is +24 degrees, and the north/south misalignment is reported as +10, latitude would be adjusted to +10+24=+34. Mount model 535 would be recalculated using this adjusted latitude value.

RMS pointing error is measured, and the current RMS pointing error is saved 808 as RMS pointing error for comparison 810, so that changes to RMS pointing error can be measured.

LST offset adjustment 817 is applied 809 to each alignment reference point. RMS pointing error is again measured based on mount model 535, and this new RMS pointing error is compared 811 with the previously stored RMS pointing error 810. If, in step 812, the new RMS pointing error is less than the previously stored RMS pointing error 810, the method returns to step 803.

If, in step 812, the new RMS pointing error is not less than the previously stored RMS pointing error 810, then a determination is made 813 as to whether LST offset adjustment 817 has already been reversed. If not, LST offset adjustment 817 is reversed 814 and the method returns to step 803. If LST offset adjustment 817 has already been reversed, then the method reverts 815 to the previous LST offset for each alignment reference point. The sum 818 of the LST offset adjustments that were applied is saved 816 as the determined LST offset 505; this LST offset 505 is then output, stored, and/or transmitted 898 as a result. The method ends 899.

Figure 10:
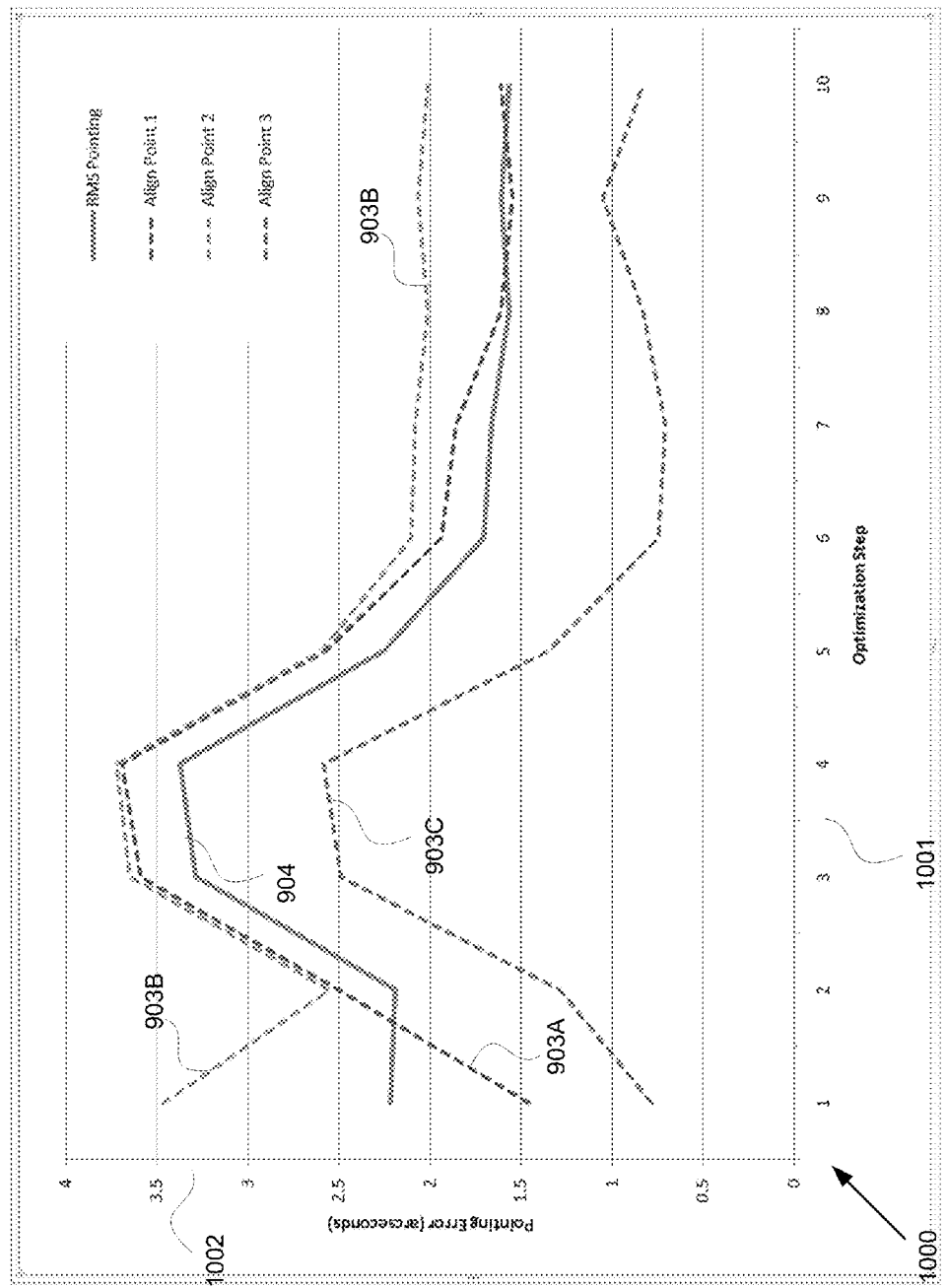
FIG. 10 is a graph depicting an example of fine adjustment of an LST offset and/or latitude, according to one embodiment of the present invention.

Referring now to FIG. 10, there is shown a graph 1000 depicting an example of results of a fine adjustment of LST offset for the same alignment reference points as considered in FIG. 9, according to one embodiment of the present invention. For each of the three alignment reference points, an RMS pointing error is measured at each step of the iterative optimization process. Here, X-axis 1001 represents the optimization step, and Y-axis 1002 represents the RMS pointing error, again given in arc-seconds. As before, plot 903A represents RMS pointing error for a first alignment reference point, plot 903B represents RMS pointing error for a second alignment reference point, and plot 903C represents RMS pointing error for a third alignment reference point, although any number of alignment points can be used.

Also shown in graph 1000 is the total RMS pointing error 904 for each optimization step. In one embodiment, successive adjustments are made until RMS pointing error 904 no longer improves over the previous step. In this example, RMS pointing error 904 is approaching 1.5 arc-minutes at step 8, but begins to increase again at step 9. Accordingly, in one embodiment, the iterative process would stop at step 8, and the adjustments made at that step would be considered to represent minimum RMS pointing error. Thus, the LST offset and latitude values are set to those of step 8 (as can be seen at step 10, where a final adjustment to LST is made), and the RMS pointing error is considered minimized.

In one embodiment, the LST for the alignment reference points shown in FIG. 10 were derived from an arbitrary time, such as 18:00 on Jan. 1, 2010. LST was determined as 00 h, 53 m. After optimization, the LST with offsets was around 22 h 41 m, which reflects the correct LST for the location at the time of alignment. Additionally, the arbitrary latitude was set to 23° N, and after the optimization, this was adjusted to within 1 degree of the actual latitude of 33.8° N for the location.

For illustrative purposes, Table 1 depicts an example of the raw data for each iteration of the Phase II optimization process as depicted in FIG. 10. The column labeled "Operation" shows "LAT" for latitude adjustment, "LST" for LST adjustment, and "FIN" for the final optimization value. The "RMS Pointing Error" column shows the RMS pointing error approaching a minimum value of about 1.55 arc-minutes. Also shown are the pointing errors for each of the three alignment reference points. The LST offset at the start is 22 hours (as it was at the end of Phase I operation). It is adjusted in +/−6 minute increments for each LST operation until the RMS pointing error minimum is detected. The LST offset at the end of optimization is 21 h 48 m, and the latitude error is 6.2 arc-minutes, which reflects the actual LST and latitude of the location with a high degree of accuracy.

TABLE 1

| Step | Operation | Latitude Error | | LST Offset | | RMS Pointing Error | | Alignment Reference Point RMS Pointing Error (Before) | | |
|---|---|---|---|---|---|---|---|---|---|---|
| | | Before | After | Before | After | Before | After | Align 1 | Align 2 | Align 3 |
| 1 | LAT | 551.6 | 1.3 | 22 h 0 m | 22 h 0 m | 2.21652 | 2.19228 | 1.454167 | 3.465249 | 0.780369 |
| 2 | LST | 1.3 | 10.9 | 22 h 0 m | 22 h 6 m | 2.19228 | 3.2856 | 2.499242 | 2.554246 | 1.28228 |
| 3 | LAT | 10.9 | −0.2 | 22 h 6 m | 22 h 6 m | 3.2856 | 3.37296 | 3.589008 | 3.647449 | 2.488929 |
| 4 | LST | −0.2 | −9.8 | 22 h 6 m | 22 h 0 m | 3.37296 | 2.24958 | 3.688702 | 3.72308 | 2.581748 |
| 5 | LST | −9.8 | −17.8 | 22 h 0 m | 21 h 54 m | 2.24958 | 1.70628 | 2.574872 | 2.595499 | 1.351034 |
| 6 | LAT | −17.8 | 0.2 | 21 h 54 m | 21 h 54 m | 1.70628 | 1.66188 | 1.935451 | 2.103901 | 0.745991 |
| 7 | LST | 0.2 | −6.2 | 21 h 54 m | 21 h 48 m | 1.66188 | 1.56474 | 1.856383 | 2.083275 | 0.704738 |
| 8 | LST | −6.2 | −10.9 | 21 h 48 m | 21 h 42 m | 1.56474 | 1.60758 | 1.608865 | 2.01452 | 0.831935 |
| 9 | LST | −10.9 | −6.2 | 21 h 42 m | 21 h 48 m | 1.60758 | 1.56474 | 1.546986 | 2.066086 | 1.048513 |
| 10 | FIN | −6.2 | x | 21 h 48 m | x | 1.56474 | x | 1.608865 | 2.01452 | 0.831935 |

In step 1, a latitude adjustment is performed, since the magnitude of the latitude error (north/south misalignment) is 551.6 arcminutes, which is greater than 10 arcminutes (step 804). In one embodiment, RMS pointing error is not considered during latitude adjustments.

In step 2, magnitude of the latitude error is 1.3, so no latitude adjustment is made. Instead, an LST offset adjustment of +6 minutes is performed. RMS pointing error increases, so the LST offset adjustment is reversed (step 814) to −6 minutes for the next LST adjustment.

In step 3, latitude adjustment is performed, since the magnitude of the latitude error is 10.9 arcminutes, which is again greater than 10 arcminutes.

In steps 4 and 5, magnitude of the latitude error is below 10 arcminutes, so no latitude adjustment is made. LST offset adjustment of −6 minutes is performed in each of these steps. RMS pointing error decreases at each step, so no reversal is performed.

In step 6, magnitude of the latitude error is again above 10 arcminutes, so a latitude adjustment is performed.

In step 7, an LST adjustment is made. RMS pointing error decreases.

In step 8, an LST adjustment is again made. RMS pointing error increases. Since the offset adjustment has already been reversed (step 813), the iterative loop is exited.

In step 9, LST reverts to the previous LST offset (step 815) from step 7.

In step 10, the process is complete, with a final LST offset of 21 h 48 m and a latitude error of −6.2.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a nontransitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability. Any reference to a "processor" herein can thus be considered to apply to a single processor or to any number of processors, either installed in one or a plurality of devices. Such processor or processors can be in one or more computing devices and/or in any other electronic device or devices, located proximate to or remote to one another.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, tablet computer, consumer electronic device, television, set-top box, or the like. An electronic device for implementing the present invention may use any operating system such as, for example, Microsoft Windows available from Microsoft Corporation of Redmond, Wash., MacOS available from Apple Inc. of Cupertino, Calif., or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for aligning a telescope, comprising:
   a) in a processor, establishing an initial time value and date value;
   b) in the processor, establishing an initial location value;
   c) in the processor, initializing a mount model based on the initial time, date, and location values, the mount model specifying a relationship between a telescopic coordinate system and a celestial coordinate system;
   d) in the processor, measuring a pointing error for the mount model with respect to at least one alignment reference point, based on the time, date, and location values; and
   e) in the processor, iteratively adjusting at least one of the time, date, and location values to reduce the pointing error of the mount model; and
   f) performing at least one selected from the group consisting of:
      at an output device, outputting the mount model;
      storing the mount model in a storage device; and
      in the processor, applying the mount model to point the telescope.

2. The method of claim 1, wherein:
   step a) comprises, in the processor, establishing an initial time value and date value without reference to an actual time and date; and
   step b) comprises, in the processor, establishing an initial location value without reference to an actual location.

3. The method of claim 1, wherein step e) comprises, in the processor, iteratively adjusting at least one of the time, date, and location values until the pointing error is smaller than a predetermined threshold value.

4. The method of claim 1, wherein step e) comprises, in the processor, iteratively adjusting at least one of the time, date, and location values until the pointing error for an iteration is not smaller than the pointing error for an immediately preceding iteration.

5. The method of claim 1, wherein step d) comprises, in the processor:
   measuring pointing errors for the mount model with respect to a plurality of alignment reference points; and
   aggregating the measured pointing errors;
   and wherein step e) comprises, in the processor, iteratively adjusting at least one of the time, date, and location values to reduce the aggregate pointing error.

6. The method of claim 1, wherein step d) comprises, in the processor:
   measuring pointing errors for the mount model with respect to a plurality of alignment reference points; and
   aggregating the measured pointing errors to generate an aggregate root-mean-square (RMS) pointing error;

and wherein step e) comprises, in the processor, iteratively adjusting at least one of the time, date, and location values to reduce the aggregate RMS pointing error.

7. The method of claim 1, wherein the initial time value and date value comprise local sidereal time.

8. The method of claim 1, wherein iteratively adjusting at least one of the time, date, and location values comprises iteratively adjusting at least one of:
   an offset for a local sidereal time value; and
   a latitude value.

9. The method of claim 1, wherein step d) comprises, for at least one alignment reference point:
   d.1) at an image capture device, capturing an image in a direction corresponding to the alignment reference point;
   d.2) in the processor, determining celestial coordinates corresponding to the captured image; and
   d.3) in the processor, comparing at least one element of the captured image to stored data for the determined celestial coordinates, to measure a pointing error.

10. The method of claim 9, wherein step d.2) comprises:
    in the processor, obtaining plate coordinate positions for a plurality of objects in the captured image;
    in the processor, generating a signature from the plate coordinate positions of the objects;
    in the processor, identifying a matching signature in a data store of signatures for celestial objects; and
    obtaining, from the data store, celestial coordinates for the matching signature.

11. The method of claim 1, wherein step e) comprises:
    e.1) in the processor, determining whether the pointing error of the mount model is smaller than a threshold value;
    e.2) responsive to the pointing error being smaller than the threshold value, storing the mount model at a storage device; and
    e.3) responsive to the pointing error not being smaller than the threshold value:
       in the processor, adjusting at least one of an local sidereal time offset and a latitude value;
       in the processor, measuring the pointing error of the mount model with respect to the at least one alignment reference point, based on the adjusted at least one value; and
       repeating steps e.1) through e.3).

12. The method of claim 1, wherein step e) comprises:
    e.1) in the processor, performing a coarse iterative adjustment to a local sidereal time offset; and
    e.2) in the processor, performing a fine iterative adjustment to at least one of the local sidereal time offset and a latitude value.

13. The method of claim 12, wherein step e.1) comprises:
    for each of a plurality of local sidereal time offset adjustment values, in the processor, measuring the pointing error of the mount model with respect to the at least one alignment reference point, the plurality of local sidereal time offset adjustment values having a fixed time increment with respect to one another; and
    in the processor, selecting the local sidereal time offset adjustment value associated with the smallest measured pointing error with respect to the at least one alignment reference point; and
    in the processor, applying the selected local sidereal time offset adjustment value to adjust the local sidereal time offset.

14. The method of claim 12, wherein step e.2) comprises:
    e.2.1) in the processor, measuring a latitude error of the mount model with respect to the at least one alignment reference point;
    e.2.2) responsive to the latitude error being greater than a predetermined threshold value, in the processor, adjusting the latitude value;
    e.2.3) in the processor, applying a local sidereal time offset adjustment;
    e.2.4) in the processor, measuring the pointing error of the mount model with respect to the at least one alignment reference point;
    e.2.5) in the processor, determining whether the measured pointing error is less than the minimum pointing error;
    e.2.6) responsive to the measured pointing error being less than the minimum pointing error, repeating steps e.2.1) through e.2.6) until the measured pointing error is below a threshold value;
    e.2.7) in the processor, applying the at least one adjusted local sidereal time offset adjustment to generate a local sidereal time offset; and
    e.2.8) applying the local sidereal time offset to the mount model.

15. The method of claim 12, wherein step e.2) comprises:
    e.2.1) in the processor, measuring a latitude error of the mount model with respect to the at least one alignment reference point;
    e.2.2) responsive to the latitude error being greater than a predetermined threshold value, in the processor, adjusting the latitude value;
    e.2.3) in the processor, applying a local sidereal time offset adjustment;
    e.2.4) in the processor, measuring the pointing error of the mount model with respect to the at least one alignment reference point;
    e.2.5) in the processor, determining whether the measured pointing error is less than the minimum pointing error;
    e.2.6) responsive to the measured pointing error being less than the minimum pointing error, repeating steps e.2.1) through e.2.6) until the measured pointing error is larger than a measured pointing error for a previous iteration;
    e.2.7) in the processor, reverting the local sidereal time offset adjustment to a local sidereal time offset adjustment associated with a minimum pointing error; and
    e.2.8) in the processor, applying the reverted local sidereal time offset adjustment to the mount model.

16. The method of claim 12, wherein step e.2) comprises:
    e.2.1) in the processor, initializing a value for a minimum pointing error;
    e.2.2) in the processor, measuring a latitude error of the mount model with respect to the at least one alignment reference point;
    e.2.3) responsive to the latitude error being greater than a predetermined threshold value, in the processor, adjusting the latitude value;
    e.2.4) in the processor, applying a local sidereal time offset adjustment;
    e.2.5) in the processor, measuring the pointing error of the mount model with respect to the at least one alignment reference point;
    e.2.6) in the processor, determining whether the measured pointing error is less than the minimum pointing error;
    e.2.7) responsive to the measured pointing error being less than the minimum pointing error, repeating steps e.2.2) through e.2.7); and
    e.2.8) responsive to the measured pointing error not being less than the minimum pointing error:

in the processor, determining whether the local sidereal time offset adjustment has previously been reversed;

responsive to the local sidereal time offset adjustment having previously been reversed:

in the processor, reverting the local sidereal time offset adjustment to a local sidereal time offset adjustment associated with the minimum pointing error;

in the processor, applying the reverted local sidereal time offset adjustment to the mount model.

17. A system for aligning a telescope, comprising:

a processor, for establishing an initial time value and date value and an initial location value:

a mount model, for specifying a relationship between a telescopic coordinate system and a celestial coordinate system, the mount model being initialized based on the initial time, date, and location values;

a pointing error measurement module, for measuring a pointing error for the mount model with respect to at least one alignment reference point, based on the time, date, and location values;

an iterative adjustment module, for iteratively adjusting at least one of the time, date, and location values to reduce the pointing error of the mount model; and a microcontroller, for applying the mount model to point the telescope.

18. The system of claim 17, wherein the processor establishes an initial time value and date value without reference to an actual time and date, and establishes an initial location value without reference to an actual location.

19. The system of claim 17, wherein the iterative adjustment module iteratively adjusts at least one of the time, date, and location values until the pointing error is smaller than a predetermined threshold value.

20. The system of claim 17, wherein the iterative adjustment module iteratively adjusts at least one of the time, date, and location values until the pointing error for an iteration is not smaller than the pointing error for an immediately preceding iteration.

21. The system of claim 17, wherein the pointing error measurement module measures pointing errors for the mount model with respect to a plurality of alignment reference points, and wherein the iterative adjustment module iteratively adjusts at least one of the time, date, and location values to reduce the aggregate pointing error.

22. The system of claim 17, wherein:

the pointing error measurement module measures pointing errors for a plurality of alignment reference points and aggregates the measured pointing errors to generate an aggregate root-mean-square (RMS) pointing error; and the iterative adjustment module iteratively adjusts at least one of the time, date, and location values to reduce the aggregate RMS pointing error.

23. The system of claim 17, wherein the initial time value and date value comprise local sidereal time.

24. The system of claim 17, wherein the iterative adjustment module adjusts at least one of:

an offset for a local sidereal time value; and a latitude value.

25. The system of claim 17, further comprising:

an image capture device, for capturing an image in a direction corresponding to the alignment reference point;

and wherein the pointing error measurement module determines celestial coordinates corresponding to the captured image and compares at least one element of the captured image to stored data for the determined celestial coordinates, to measure a pointing error.

26. The system of claim 25, further comprising:

a data store of signatures for celestial objects;

and wherein the pointing error measurement module determines celestial coordinates corresponding to the captured image by:

obtaining plate coordinate positions for a plurality of objects in the captured image;

generating a signature from the plate coordinate positions of the objects;

identifying a matching signature in the data store; and obtaining, from the data store, celestial coordinates for the matching signature.

27. The system of claim 17, wherein the iterative adjustment module iteratively adjusts at least one of the time, date, and location values by:

e.1) in the processor, determining whether the pointing error of the mount model is smaller than a threshold value;

e.2) responsive to the pointing error being smaller than the threshold value, storing the mount model at a storage device; and e.3) responsive to the pointing error not being smaller than the threshold value:

adjusting at least one of an local sidereal time offset and a latitude value;

causing the pointing error measurement module to measure the pointing error of the mount model with respect to the at least one alignment reference point, based on the adjusted at least one value; and repeating steps e.1) through e.3).

28. The system of claim 17, wherein the iterative adjustment module iteratively adjusts at least one of the time, date, and location values by:

performing a coarse iterative adjustment to a local sidereal time offset; and performing a fine iterative adjustment to at least one of the local sidereal time offset and a latitude value.

29. The system of claim 28, wherein the iterative adjustment module performs a coarse iterative adjustment to a local sidereal time offset by:

for each of a plurality of local sidereal time offset adjustment values, causing the pointing error measurement module to measure the pointing error of the mount model with respect to the at least one alignment reference point, the plurality of local sidereal time offset adjustment values having a fixed time increment with respect to one another; and selecting the local sidereal time offset adjustment value associated with the smallest measured pointing error with respect to the at least one alignment reference point; and applying the selected local sidereal time offset adjustment value to adjust the local sidereal time offset.

30. The system of claim 28, wherein the iterative adjustment module performs a fine iterative adjustment to at least one of the local sidereal time offset and a latitude value by:

e.2.1) initializing a value for a minimum pointing error;

e.2.2) causing the pointing error measurement module to measure a latitude error of the mount model with respect to the at least one alignment reference point;

e.2.3) responsive to the latitude error being greater than a predetermined threshold value, in the processor, adjusting the latitude value;

e.2.4) applying a local sidereal time offset adjustment;
e.2.5) causing the pointing error measurement module to measure the pointing error of the mount model with respect to the at least one alignment reference point;
e.2.6) determining whether the measured pointing error is less than the minimum pointing error;
e.2.7) responsive to the measured pointing error being less than the minimum pointing error, repeating steps e.2.2) through e.2.7); and
e.2.8) responsive to the measured pointing error not being less than the minimum pointing error:
   determining whether the local sidereal time offset adjustment has previously been reversed;
   responsive to the local sidereal time offset adjustment having previously been reversed:
      reverting the local sidereal time offset adjustment to a local sidereal time offset adjustment associated with the minimum pointing error;
      applying the reverted local sidereal time offset adjustment to the mount model.

31. A computer program product for aligning a telescope, comprising:
   a non-transitory computer-readable storage medium; and
   computer program code, encoded on the medium, for causing at least one processor to perform the steps of:
   a) establishing an initial time value and date value;
   b) establishing an initial location value;
   c) initializing a mount model based on the initial time, date, and location values, the mount model specifying a relationship between a telescopic coordinate system and a celestial coordinate system;
   d) measuring a pointing error for the mount model with respect to at least one alignment reference point, based on the time, date, and location values; and
   e) iteratively adjusting at least one of the time, date, and location values to reduce the pointing error of the mount model; and
   f) performing at least one selected from the group consisting of:
      outputting the mount model;
      storing the mount model in a storage device; and
      applying the mount model to point the telescope.

* * * * *